(12) United States Patent
Fayeulle et al.

(10) Patent No.: US 6,850,382 B2
(45) Date of Patent: Feb. 1, 2005

(54) METHOD FOR WEAR REDUCTION OF A DISC SURFACE THROUGH STIMULATED TAKE OFF OF A HEAD FOR A DISC DRIVE

(75) Inventors: Serge Jacques Fayeulle, Longmont, CO (US); Paul W. Smith, Niwot, CO (US)

(73) Assignee: Seagate Technology LLC, Scotts Valley, CA (US)

(*) Notice: Subject to any disclaimer, the term of this patent is extended or adjusted under 35 U.S.C. 154(b) by 296 days.

(21) Appl. No.: 09/896,648

(22) Filed: Jun. 28, 2001

(65) Prior Publication Data

US 2002/0131194 A1 Sep. 19, 2002

Related U.S. Application Data

(60) Provisional application No. 60/275,440, filed on Mar. 14, 2001.

(51) Int. Cl.[7] .......................... G11B 21/02; G11B 15/46
(52) U.S. Cl. ...................................... 360/75; 360/73.03
(58) Field of Search ................. 360/75, 78.08, 360/70, 73.03, 78.04, 78.06, 78.12, 230, 234, 234.1, 234.3

(56) References Cited

U.S. PATENT DOCUMENTS

| | | | |
|---|---|---|---|
| 4,530,021 A | * 7/1985 | Cameron | ...................... 360/97 |
| 5,371,637 A | 12/1994 | Yamada | |
| 5,384,675 A | * 1/1995 | Crawforth et al. | ............. 360/75 |
| 5,446,606 A | 8/1995 | Brunner et al. | |
| 5,530,602 A | * 6/1996 | Boutaghou et al. | ............ 360/75 |
| 5,825,575 A | 10/1998 | Lee | |
| 5,982,571 A | * 11/1999 | Calfee et al. | .................. 360/70 |
| 6,002,549 A | 12/1999 | Berman et al. | |
| 6,072,652 A | * 6/2000 | Lee | ............................... 360/71 |

* cited by examiner

*Primary Examiner*—Andrew L. Sniezek
(74) *Attorney, Agent, or Firm*—Fellers, Snider, et al.

(57) ABSTRACT

Dispersing and reducing wear of a rotatable disc surface using a stimulated take off process to accelerate formation of an air bearing between a read/write head and a non-textured circumferential landing zone of a rotatable disc surface of a disc drive by accelerating the non-textured circumferential landing zone of the rotatable disc surface to a rotational operating speed through application of a current to a spindle motor assembly securing the rotatable disc surface while stimulating a head stack assembly with a reciprocating lateral displacement effectuating a tracing of a radially varying path across and around the circumferential landing zone of the rotatable disc surface by the read/write head accelerating formation of the air bearing between the read/write head and a non-textured circumferential landing zone, thereby dispersing and reducing wear of the rotatable disc surface.

20 Claims, 7 Drawing Sheets

METHOD FOR WEAR REDUCTION OF A DISC SURFACE THROUGH STIMULATED TAKE OFF OF A HEAD FOR A DISC DRIVE

RELATED APPLICATIONS

This application claims priority to U.S. Provisional Application No. 60/275,440 filed Mar. 14, 2001, entitled Stimulated Take Off Process For CSS Applications and The Way to Reach It.

FIELD OF THE INVENTION

This invention relates generally to the field of data storage devices, and more particularly, but not by way of limitation, to incorporation of a method for wear reduction of a disc surface through stimulated take off of a head for a disc drive.

BACKGROUND

Disc drives are used for data storage in modern electronic products ranging from digital cameras to computer systems and networks. Typically, a disc drive includes a mechanical portion, or head disc assembly (HDA), and electronics in the form of a printed circuit board assembly (PCB), mounted to an outer surface of the HDA. The PCB controls HDA functions and provides an interface between the disc drive and its host.

Generally, a HDA comprises one or more magnetic discs affixed to a spindle motor assembly for rotation at a constant speed, an actuator assembly supporting an array of read/write heads that traverse generally concentric data tracks radially spaced across the disc surfaces and a voice coil motor (VCM) providing rotational motion to the actuator assembly. Continued demand for disc drives with ever increasing levels of data storage capacity, faster data throughput and decreasing price per megabyte have led disc drive manufacturers to seek ways to increase the storage capacity and improve overall operating efficiencies of the disc drive. Present generation disc drives typically achieve aerial bit densities of several gigabits per square centimeter, Gbits/cm$^2$. Increasing recording densities can be achieved by increasing the number of bits stored along each track or bits per inch (BPI), generally requiring improvements in the read/write channel electronics, and/or by increasing the number of tracks per unit width or tracks per inch (TPI), generally requiring improvements in servo control systems.

One approach taken by disc drive manufacturers to increase recording density is through reduction in fly height of the read/write heads. Reducing the fly height of the read/write heads decreases the surface area occupied by data, thereby increasing number of bits capable of being stored on the on the surface area of the rotatable disc surface, which promotes an increase in both BPI and TPI.

Typically, disc drive manufacturers select a region on each rotatable disc surface, referred to as a landing zone, for the read/write head to land on and take off from. In most applications, the landing zone has a non-smooth or textured surface to mitigate a phenomenon referred to as stiction, an adhesion of the read/write head to the rotatable disc surface as a result of two smooth surfaces coming in contact with each other. One method of providing this non-smooth surface is to texturize the landing zone using a laser beam. The laser beam is held at an energy output level sufficient cause a plurality of minute eruptions on the otherwise smooth rotatable disc surface. The result of the process is a laser zone texture (LZT).

Subsequent to the texturing process, one of the final steps in a media preparation process is the application of a carbon overcoat. The carbon overcoat serves as a wear surface between the read/write head and a magnetic recording layer of the disc. Breakdown of a carbon overcoat leads to corrosion of the magnetic recording layer, which eventually renders the entire rotatable disc surface inoperable, as a magnetic storage medium.

The height of the plurality of laser eruptions is typically controlled to be no greater than a nominal fly height of read/write head. Therefore as fly heights of the read/write heads decrease, the height of the laser eruptions of the landing zone likewise decreases. The decrease in height of the laser eruptions results in an increase in surface area exposure of the rotatable disc surface to the read/write head. As the non-smooth textured surface approaches a smooth surface, adhesion between the read/write head and the landing zone of the rotatable disc surface increases. An increase in adhesion between the read/write head and the landing zone results in extending contact time between the read/write head and the disc surface during spin up of the disc drive. Extending the contact time accelerates wear of the carbon overcoat, which reduces the operating life of the disc drive.

Therefore, challenges remain and a need persists for techniques that reduce contact time between the read/write head and the rotatable disc surface during take off and extend the operating life of the carbon overcoat protecting the magnetic layer of the rotatable disc surface.

SUMMARY OF THE INVENTION

The present invention provides a method for dispersing and reducing wear of a rotatable disc surface by using a stimulated take off process to accelerate formation of an air bearing between a read/write head and a non-textured or textured circumferential landing zone of a rotatable disc surface of a disc drive. The method includes accelerating the non-textured circumferential landing zone of the rotatable disc surface to a rotational operating speed through application of a current to a spindle motor assembly securing the rotatable disc surface, stimulating a head stack assembly with a reciprocating lateral displacement by applying a stimulation signal to an actuator coil, which effectuates a tracing of a radially varying path across and around the circumferential landing zone of the rotatable disc surface by the read/write head during acceleration of the non-textured landing zone. Stimulating the read/write heads during acceleration of the non-textured landing zone accelerates formation of the air bearing between the read/write head and a non-textured circumferential landing zone, thereby dispersing and reducing wear of the rotatable disc surface.

These and various other features and advantages which characterize the present invention will be apparent from a reading of the following detailed description and a review of the associated drawings.

DETAILED DESCRIPTION

Figure 1:
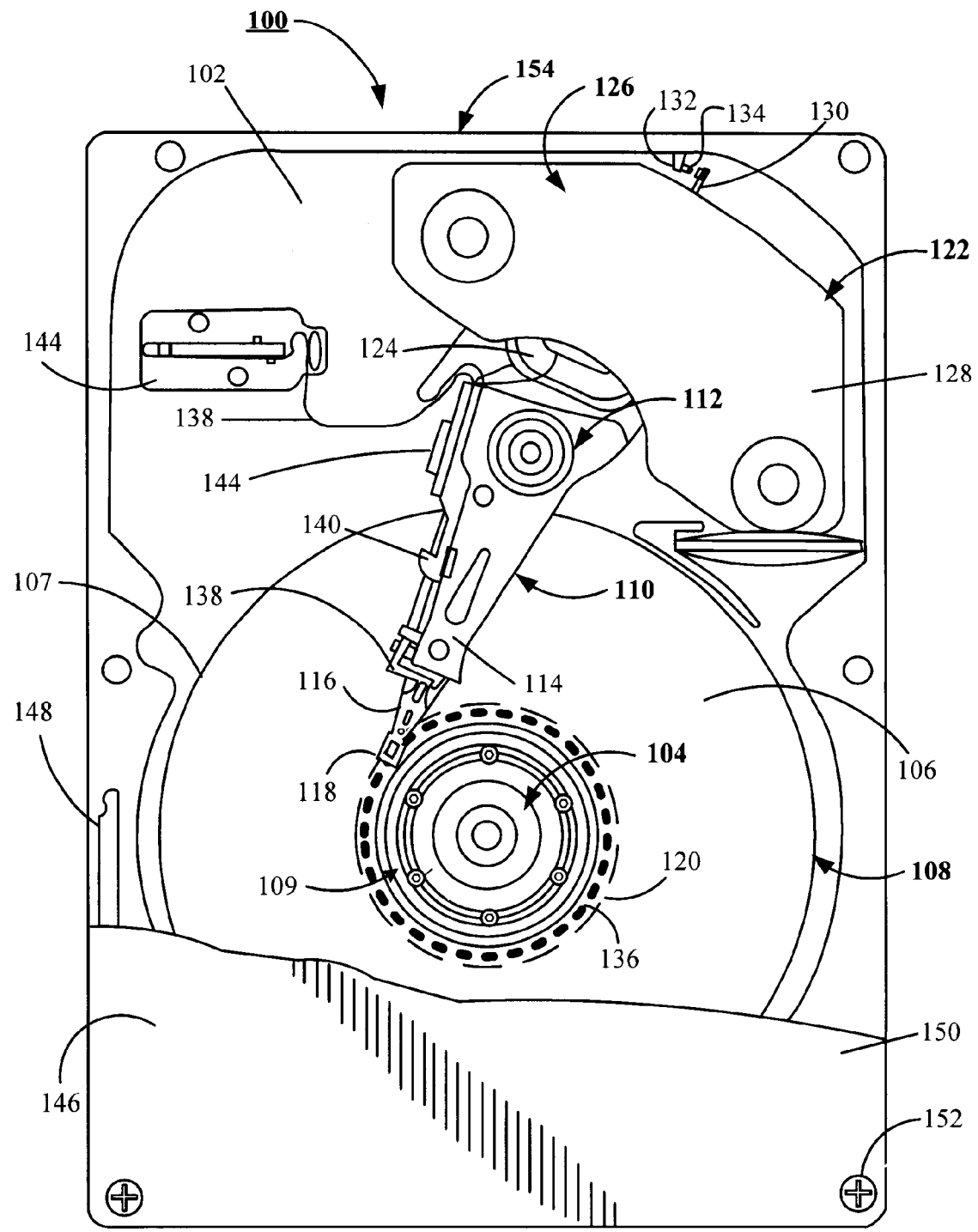
FIG. 1 is a top plan view of a disc drive incorporating a method for wear reduction of a rotatable disc surface through implementation of a stimulated take off process of a read/write head for a disc drive.

Referring to the drawings in general, and more particularly to FIG. 1, shown therein is a top view of a disc drive 100 constructed in accordance with an embodiment of present invention. Numerous details of and variations for the construction of the disc drive 100 are not included in the following description as such are well-known to those skilled in the art and are believed to be unnecessary for the purpose of describing embodiments of the present invention.

The disc drive 100 includes a basedeck 102 supporting various disc drive components, including a spindle motor assembly 104. The spindle motor assembly 104 supports at least one axially aligned rotatable disc surface 106 having an outer diameter 107, forming a disc stack 108 (also referred to as a "disc pack"). Additionally, it is noted that the disc surface 106 includes an inner diameter 109.

Adjacent the disc stack 108 is an actuator assembly 110 (also referred to as a head stack assembly (HSA)), which pivots about an actuator motor support 112 (also referred to as a bearing assembly) in a rotary fashion. The HSA 110 includes at least one actuator arm 114 that supports a load arm 116, which in turn typically supports at least one read/write head 118 (also referred as head 118) corresponding to each disc surface 106. Each rotatable disc surface 106 is divided into concentric circular data tracks 120 (only one shown) over which the read/write heads 118 are positionably located, and on which servo data are written to embedded servo sectors (not separately shown), which separate a plurality of data sectors (not separately shown) used by customers for data storage.

The term servoing (also referred to herein as position-controlling) as used herein means, maintaining control of the read/write head 118 relative to the rotating disc surface 106 of disc drive 100 (of FIG. 1) throughout all operations of disc drive 100. During servoing operations, the HSA 110 is controllably positioned by an actuator motor 122 (also referred to as a voice coil motor assembly (VCM)), which includes an actuator coil 124 immersed in the magnetic field generated by a magnet assembly 126. A magnetically permeable flux path provided by a steel plate 128 (also called a top pole piece) mounted above the actuator coil 124 to complete the magnetic circuit of the VCM 122. During operation of the disc drive 100, current is passed through the actuator coil 124 and an electromagnetic field is setup, which interacts with the magnetic circuit of the VCM 122 to cause the actuator coil 124 to move relative to the magnet assembly 126 in accordance with the well-known Lorentz relationship. As the actuator coil 124 moves, the HSA 110 pivots about the bearing assembly 112, causing the heads 118 to move over the surfaces of the discs 106, thereby achieving a positioning of the heads 118 adjacent a selected data track 120 of the disc surfaces 106.

During a shutdown operation, the disc drive 100 positions an actuator stop 130 adjacent a crash stop 132 that includes a compressible, resilient bumper 134, while positioning the read/write heads 118 adjacent a textured landing zone 136 and places the HSA 110 in a parked position. A latch assembly (not separately shown) secures the HSA 110 in the parked position, while the disc drive slows and stops the spindle motor assembly 104. While the spindle motor assembly 104 spins down, the heads 118 land on a landing zone 136. The landing zone 136, shown by heavy dashed lines, is several times the width of the data track 120. However, during a landing operation, the read/write heads 118 are typically positioned in substantially the same radial position as they were in each proceeding landing operation, but typically contact the landing zone 136 at random circumferential points of the landing zone 136 from spin down to spin down.

To provide the requisite electrical conduction paths between the read/write heads 118 and disc drive read/write circuitry (not shown), read/write head conductors (not separately shown) are affixed to a read/write flex circuit 138. The read/write flex circuit 138 is routed from the load arms 116 along the actuator arms 114 and into a flex circuit containment with channel 140, then on to a flex connector body 142. The flex connector body 142 supports the flex circuit 138 during passage of the read/write flex circuit 138 through the basedeck 102 and into electrical communication a disc drive printed circuit board assembly (PCBA) (not shown) mounted to the underside of the basedeck 102. The flex circuit containment channel 140 also supports read/write signal circuitry, including preamplifier/driver (preamp) 144 used to condition read/write signals passed between the read/write circuitry (not shown) and the read/write heads 118. The PCBA of the disc drive supports read/write circuitry, which controls the operation of the heads 118, as well as other interface and control circuitry for the disc drive 100.

A top cover 146 compresses a formed-in-place gasket 148 (partially removed) against support surface 150 of the basedeck 102 as a result of securing top cover fasteners 152 through the top cover 146 and into the basedeck 102. The attached top cover 146 in combination with the formed-in-place gasket 148 along with the disc pack 108 and the HSA 110 secured to the basedeck 102, form a head disc assembly (HDA) 154.

Figure 2:
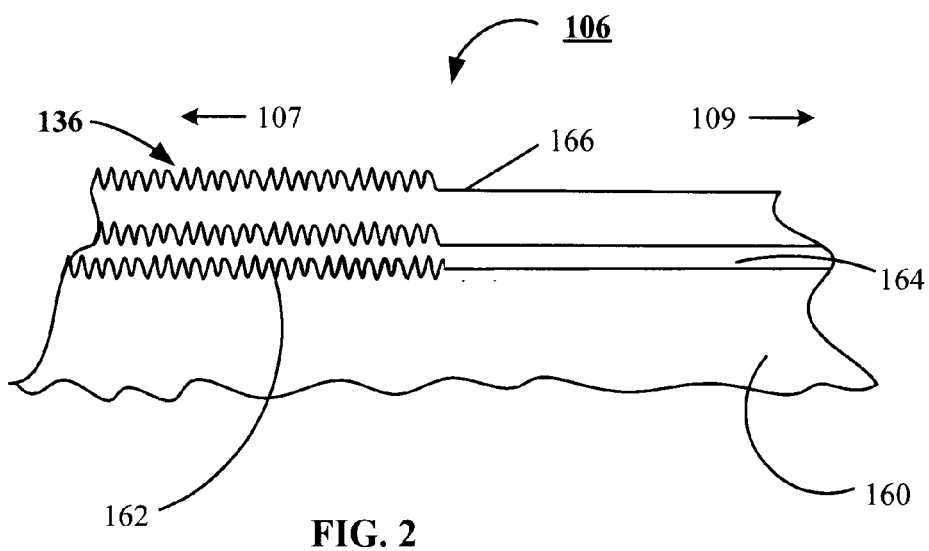
FIG. 2 is an elevational partial cross-sectional view showing a carbon overcoat supported by magnetic layer, which in turn is supported by a substrate of the rotatable disc surface of the disc drive of FIG. 1.

Shown by FIG. 2 is a substrate 160 of the rotatable disc surface 106 with several laser induced eruptions 162 supporting a magnetic layer 164 which in turn supports a carbon overcoat 166. The substrate 160 is typically provided in either an aluminum alloy or glass composition, but may be provided in alternate materials without imposing a limitation on the present invention. The laser-induced eruptions 162 provide a base and configuration for a non-smooth surface of the landing zone 136. The non-smooth surface of the landing zone 136 mitigates against stiction between the read/write head 118 (of FIG. 1) and rotatable disc surface 106, while the magnetic layer 164 of the rotatable disc surface 106 provides the medium for reading and writing data to the rotatable disc surface 106 using the read/write head 118 (of FIG. 1). The carbon overcoat 166 provides protection for the magnetic layer 164 against corrosive elements within the operating environment of the disc drive 100 (of FIG. 1) as well as a wear surface for the read/write head 118 (of FIG. 1) to land on and takeoff from during spin ups and spin downs of the spindle motor assembly 104 (of FIG. 1). It is noted that, the landing zone 136 may be adjacent either the inner diameter 109 as shown by FIG. 1, or the outer diameter 107 as shown by FIG. 2.

In order to decrease fly height of the read/write head 118 (of FIG. 1), as a means of increasing areal densities of the disc drive 100 (of FIG. 1), the laser induced eruptions 162 (of FIG. 2) of the substrate 160 (of FIG. 2) are controlled to a height not greater than the nominal fly height of the read/write head 118. In other words, as fly height decreases the height of the laser induced eruptions 162 (of FIG. 2) is correspondingly decreased, which results in the reduction in height of the texture of the landing zone 136 assuring clearance between the read/write head 118 (of FIG. 1) and the landing zone 136 while the read/write head 118 (of FIG. 1) is flying.

A reduction in a height of the texture of the landing zone 136 results in the exposure of a larger surface area of the landing zone 136 to the read/write head 118 (of FIG. 1) during periods of contact between the landing zone 136 and the read/write head 118 (of FIG. 1), and a smaller clearance between the air bearing surface of the read/write head 118 and the landing zone 136. To counteract increased surface area contact between the landing zone 136 and the read/write head 118 (of FIG. 1), padded sliders (not shown separately) have been incorporated into the read/write head 118 (of FIG. 1). Inclusion of read/write heads 118 (of FIG. 1) with padded sliders has resulted in presentation of a more abrasive surface by the read/write head 118 (of FIG. 1) to the landing zone 136.

Figure 3:
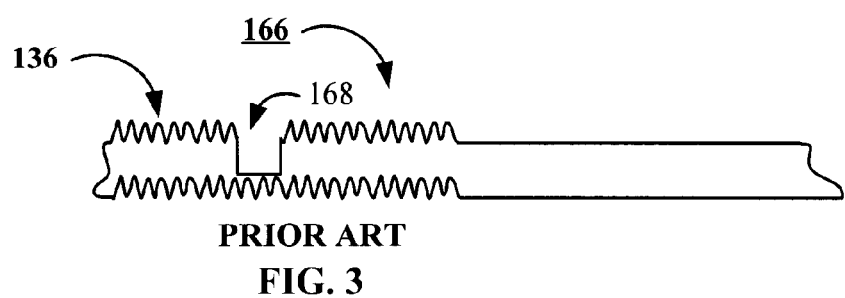
FIG. 3 is an elevational partial cross-sectional view showing a typical wear pattern in the carbon overcoat of FIG. 2.

FIG. 3 shows a wear pattern 168 between a read/write head 118 (of FIG. 1) with padded sliders and the landing zone 136. The wear pattern 168 is a result of techniques employed by prior art that position and maintain the read/write head 118 (of FIG. 1) in substantially the same radial region of a landing zone 136 during takeoffs and landings of the read/write head 118 (of FIG. 1). Over time, the surface of the carbon overcoat 166 is eroded as a result of repeated contact start and contact stop (CSS) activities by the read/write head 118 during operations of the disc drive 100 (of FIG. 1). Once the carbon overcoat 166 fails, the magnetic layer 164 (of FIG. 2) is susceptible to corrosion, and over time will fail, resulting in an inability of the magnetic layer 164 to store data.

Figure 4:
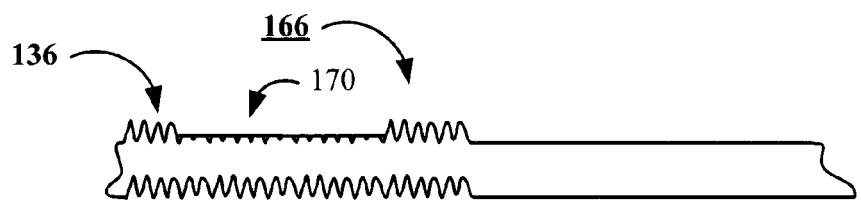
FIG. 4 is an elevational partial cross-sectional view showing a wear pattern of the present invention in the carbon overcoat of FIG. 2.

FIG. 4 shows a typical wear pattern 170 resulting from implementation of a method (discussed below) of the present invention. In comparing FIG. 3 and FIG. 4, the amount of wear (wear volume) sustained by the carbon overcoat 166 in FIG. 3 is approximately equal to the amount of wear sustained by the carbon overcoat 166 in FIG. 4, as the carbon overcoat 166 of both figures sustained an approximately equal period of CSS time. However, it is noted that the wear pattern 170 is distributed over a larger surface area of the landing zone 136. Distributing the wear across a larger surface area of the landing zone 136 extends the useful life of the carbon overcoat 166, thereby prolonging the life of the disc drive 100 (of FIG. 1).

Through the use of a stimulation signal applied to the HSA 110 (of FIG. 1) subsequent to commencement of a spin up of the spindle motor assembly 104 (of FIG. 1), the read/write head 118 undergoes a small reciprocal displacement that traces a radially varying path (not separately shown), varying radially from the center of rotation of the rotatable disc drive. The radially varying path is traced across the surface and around the circumference of the landing zone 136 by the read/write head 118 (of FIG. 1) during spin up of the disc drive 100 (of FIG. 1). Because the starting point of the radially varying path, occurring each time the disc drive 100 (of FIG. 1) is spun up, is random at each spin up, utilizing the stimulation signal to produce the small reciprocal displacement of the read/write head 118 that traces the radially varying path on the carbon overcoat 166, minimizes repetitive exposure to wear experienced by any particular portion of the carbon overcoat 166 lying a substantially equal distance from an axis of rotation of the rotatable disc surface 106. In other words, wear resulting from takeoffs and landings to the landing zone 136, by the read/write head 118, is dispersed across a larger surface area of the landing zone 136 than is possible absent the application of the stimulation signal applied to the HSA 110. Dispersing the wear across a larger surface area of the landing zone 136 promotes extended life of the carbon overcoat 166, which extends the life of the rotatable disc surface 106 (of FIG. 1).

In addition to dispersing the wear, experimental results show that actual take off time of the read/write head 118 from the landing zone 136, with the inclusion of the small reciprocal displacement of the read/write head 118, following an initiation of the spin up of the spindle motor assembly 104 (of FIG. 1), is reduced.

Figure 5:
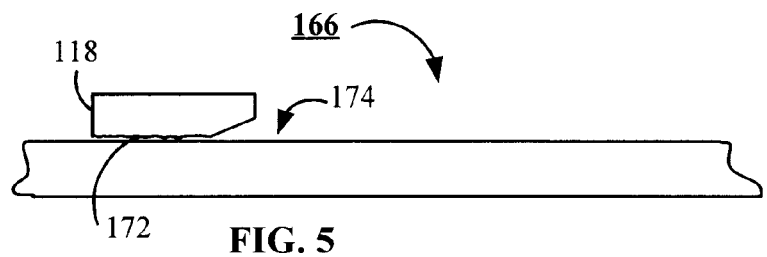
FIG. 5 is an elevational partial cross-sectional view showing a read/write head with a padded slider adjacent a non-textured landing zone of the disc drive of FIG. 1.

FIG. 5 shows the read/write head 118 with a padded slider 172 adjacent a non-textured landing zone 174 of the carbon overcoat 166 of the rotatable disc surface 106 (of FIG. 1). The inclusion of the padded slider 172 of the read/write head 118 permits production of the rotatable disc surface 106 (of FIG. 1) without having to submit the substrate 160 (of FIG. 2) to a laser texturing process step used to produce the laser induced eruptions 162 (of FIG. 2). Eliminating the laser texturing process step from the rotatable disc surface 106 (of FIG. 1) manufacturing process, yields a cost reduction in the overall cost of producing the disc drive 100 (of FIG. 1).

Figure 6:
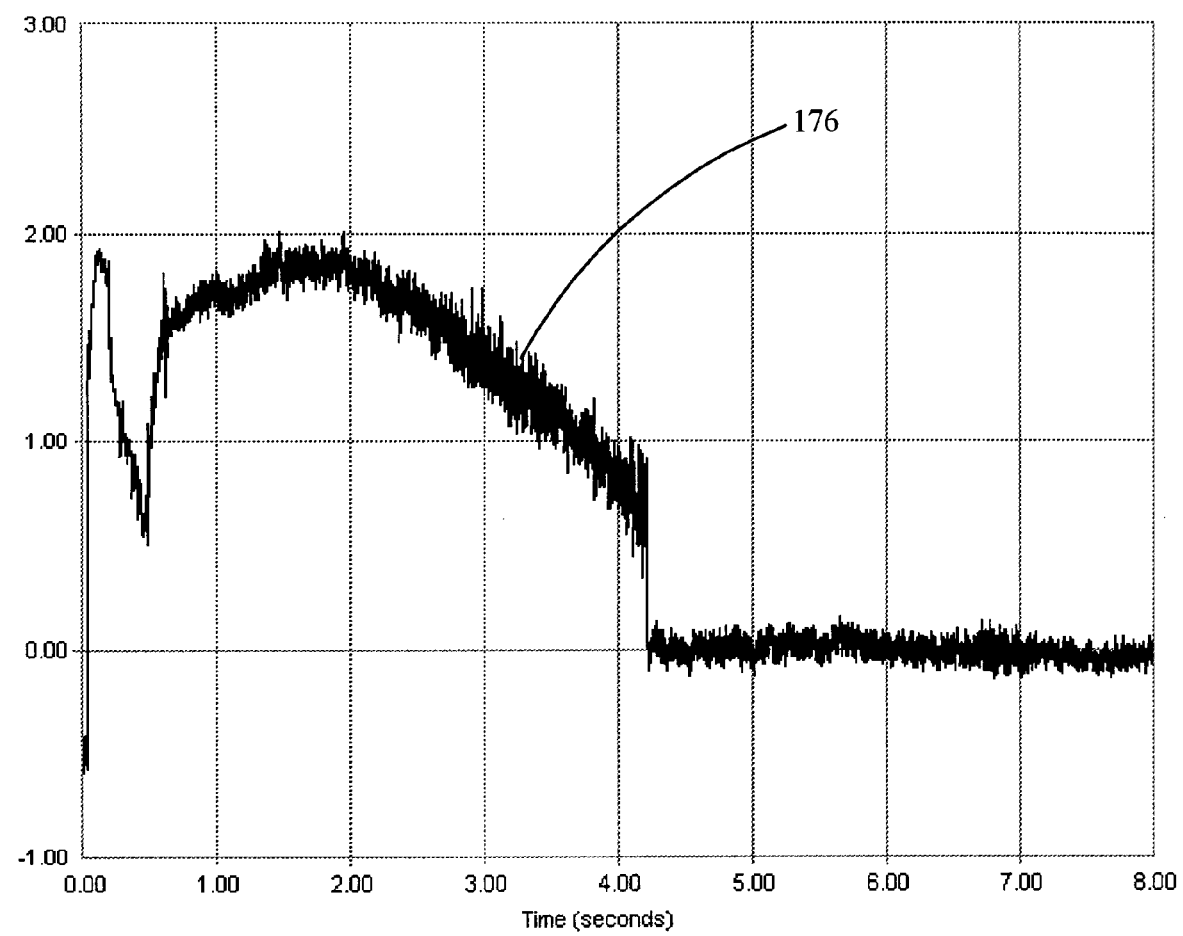
FIG. 6 is a graphical presentation of frictional force measurements of the padded slider adjacent the non-textured landing zone achieving take off in the absences of the stimulated take off process during spin up of the disc drive of FIG. 1.

FIG. 6 shows a friction force evolution versus time plot 176 of the read/write head 118 with padded sliders 172 (of FIG. 5) during spin up of the rotatable disc surface 106 (of FIG. 1), with full speed of the spindle motor assembly 104 (of FIG. 1) reached after 4 seconds. Use of the small reciprocal displacement of the read/write head 118 is absent during the spin up cycle of the rotatable disc surface 106 (of FIG. 1). As a result, take off of the read/write head 118 with padded sliders 172 (of FIG. 5) occurs after 4.5 seconds. In 40 to 80 percent of the cases, take off of the read/write head 118 with padded sliders 172 (of FIG. 5) from the non-textured landing zone 174 (of FIG. 5) occurs even later (or not at all) as shown by a friction force evolution versus time plot 178 in FIG. 7.

Figure 7:
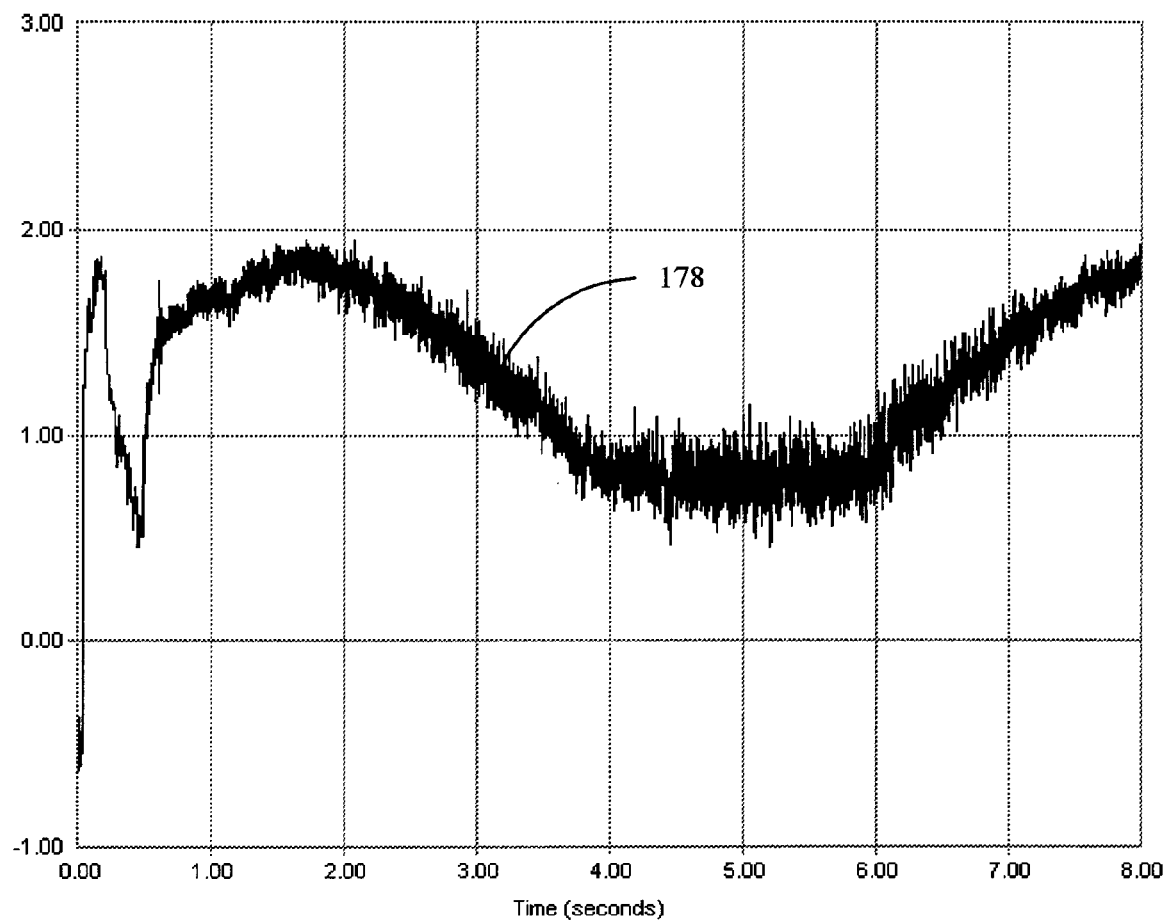
FIG. 7 is a graphical presentation of frictional force measurements of the padded slider adjacent the non-textured landing zone failing to achieve take off in the absences of the stimulated take off process during spin up of the disc drive of FIG. 1.

The problem shown by FIG. 7 is an inability of the read/write head 118 with padded sliders 172 (of FIG. 5) to take off from the non-textured landing zone 174 (of FIG. 5) due to an inability to break an adhesion/meniscus force developed between the read/write head 118 with padded sliders 172 (of FIG. 5) and the non-textured landing zone 174 (of FIG. 5). This force opposes the establishment of hydrodynamic lift in an air bearing (not separately shown) developed between the read/write head 118 with padded sliders 172 (of FIG. 5) and rotation of the non-textured landing zone 174 (of FIG. 5) beneath the read/write head 118 with padded sliders 172 (of FIG. 5).

During a spin up cycle, the spindle motor assembly 104 (of FIG. 1) accelerates from a stationary status to an operational status of substantially constant rotational velocity. By adding the small reciprocal displacement of the read/write head 118 (also referred to as a stimulated take off process described below) during the acceleration portion of the spin up cycle, it is possible to reliably provide take off of the read/write head 118 with padded sliders 172 (of FIG. 5) at every start of the disc drive 100 (of FIG. 1), and to do so prior to the spindle motor assembly 104 (of FIG. 1) reaching the operational status of substantially constant rotational speed.

Figure 8:
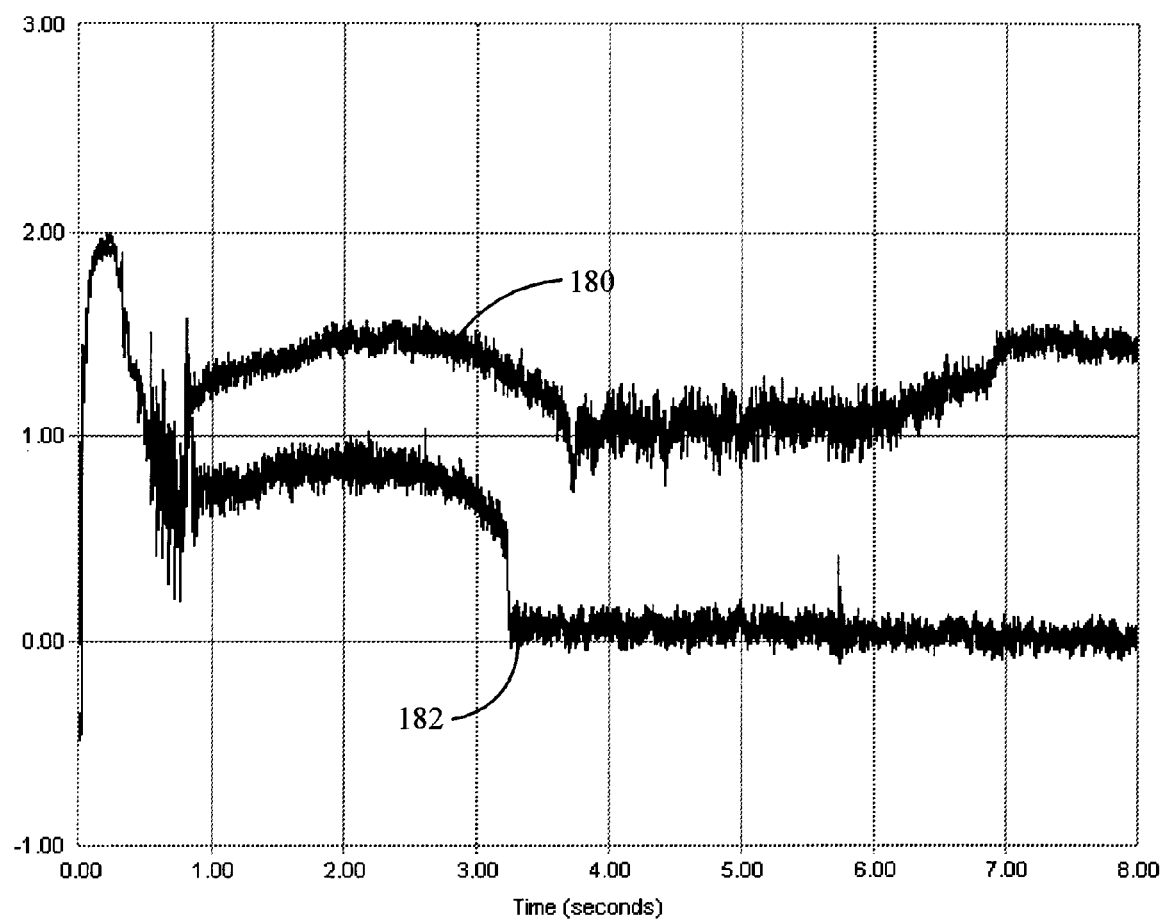
FIG. 8 is a graphical presentation of frictional force measurements of the padded slider adjacent the non-textured landing zone with and without the stimulated take off process during spin up of the disc drive of FIG. 1.

In FIG. 8, a pair of friction force evolution versus time plots 180 and 182, are shown for the same read/write head 118 with padded sliders 172 (of FIG. 5) responding to the same non-textured landing zone 174 (of FIG. 5) during separate spin up processes. The friction force evaluation versus time plot 180 shows the response of the read/write head 118 with padded sliders 172 (of FIG. 5) to the non-textured landing zone 174 (of FIG. 5) without using the stimulated take off process. As shown by the friction force evaluation versus time plot 180, the read/write head 118 with padded sliders 172 (of FIG. 5) never attains flight.

Friction force evaluation versus time plot 182 shows that, by using the simulated take off process of a first embodiment, a lateral displacement of substantially + and −0.02 inch (0.0508 cm.) at a frequency in the range of substantially 5 Hz to 50 Hz is imposed on the read/write head 118 with padded sliders 172 (of FIG. 5) of the HSA 110 (of FIG. 1) between 0.5 and 0.9 sec of elapsed time into the acceleration portion of the spin up process for duration of substantially 0.40 seconds, take off of the read/write head 118 with padded sliders 172 (of FIG. 5) occurs after 3.3 seconds. It will be noted that through utilizing of acceleration elapsed time, the lateral displacement of the read/write head 118 is provided irrespective of the actual rotational velocity of the disc 108 (of FIG. 1). Friction force evaluation versus time plot 182 also shows that the friction force level is globally much lower during the contact phase (between 1 and 3 sec). The lateral displacement of the read/write head 118 with padded sliders 172 (of FIG. 5) is a result of applying a stimulation voltage signal (not separately shown) of predetermined amplitude, frequency and profile to the actuator coil 124 of the HSA 110 (of FIG. 1) from the PCB (not shown) mounted to the underside of the basedeck 102 of the disc drive 100 (of FIG. 1). It is noted that, the voltage amplitude of the stimulation signal is drive configuration dependent and a function of the mass of the actuator assembly elected for use within the disc drive.

These values can vary depending on the characteristics of the interface between the read/write head 118 with padded sliders 172 (of FIG. 5) and the non-textured landing zone 174 (of FIG. 5). Particularly, the time at which the stimulated take off process is started should correspond to the time at which the minimum of the friction force is reached. Variations in timing, amplitude, frequency and duration of the stimulated take off process are drive configuration dependent, and can occur without imposing a limitation on the present invention.

It is also noted that the frequency profile of the stimulated take off process is not a limitation on the present invention. The frequency profile may be sinusoidal, square wave, saw tooth or other configurations without imposing a limitation on the present invention.

In an alternate embodiment, the stimulated take off process commences with stimulation of the read/write head 118 with padded sliders 172 (of FIG. 5) at a frequency in a range of substantially 50 Hz to 150 Hz for duration of less than 0.20 seconds. This stimulation cycle occurs prior to accelerating the spindle motor assembly 104 (of FIG. 1) and agitates the read/write head 118 with padded sliders 172 (of FIG. 5), which disrupts the adhesion/meniscus force developed between the read/write head 118 with padded sliders 172 (of FIG. 5) and the non-textured landing zone 174 (of FIG. 5). Following agitation of the adhesion/meniscus force, a lateral displacement of substantially + and −0.02 inch (0.05 cm.) at a frequency in a range of substantially 5 Hz to 50 Hz applied to the read/write head 118 with padded sliders 172 (of FIG. 5) for a duration of substantially 0.40 seconds while the spindle motor assembly 104 (of FIG. 1) is accelerating.

In an another alternate embodiment, the stimulated take off process includes driving the actuator stop 130 (of FIG. 1) against the compressive, resilient bumper 134 (of FIG. 1) thereby compressing the bumper 134 and allowing the read/write head 118 with padded sliders 172 (of FIG. 5) to utilize surface area of the non-textured landing zone 174 (of FIG. 5) that would otherwise be unavailable to the read/write head 118 with padded sliders 172. Under this embodiment, the range of motion is extended by between 0.005 and 0.010 centimeters.

Figure 9:
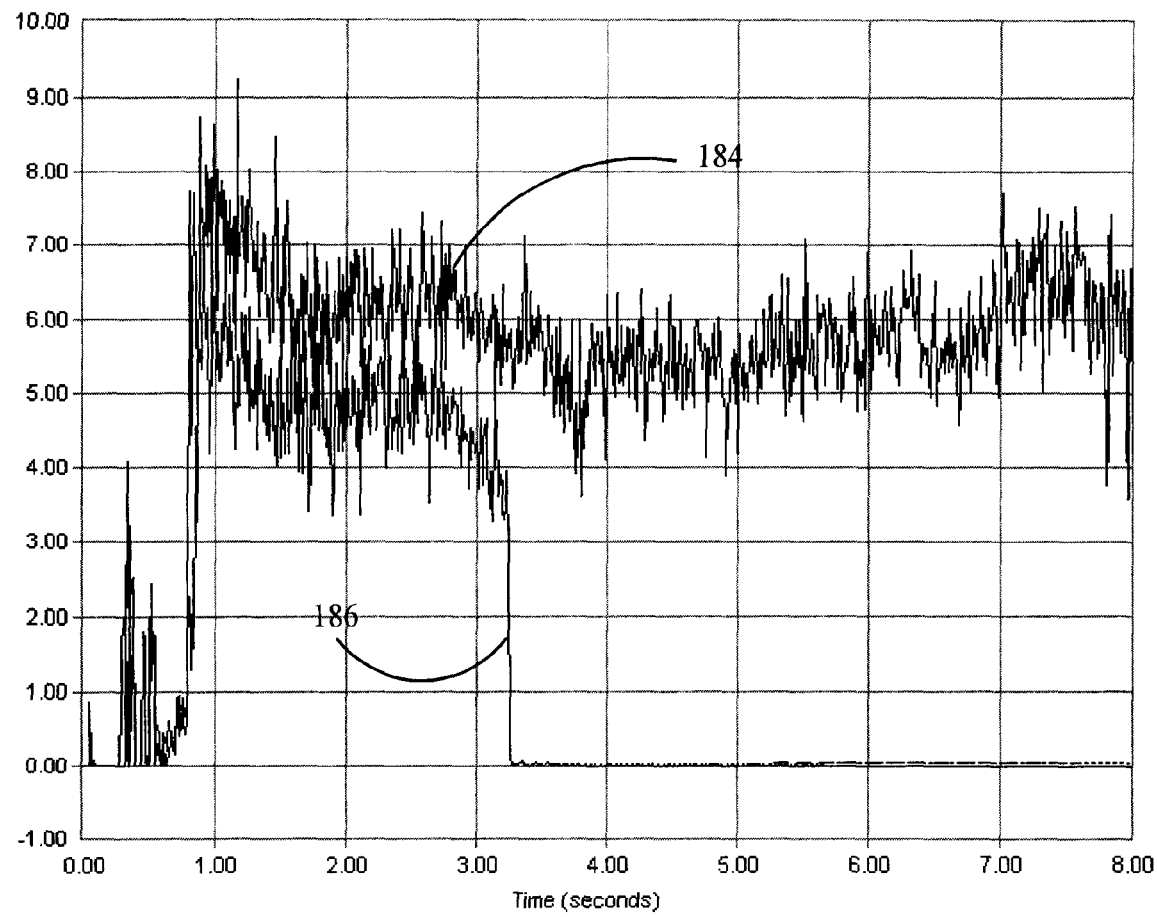
FIG. 9 is a graphical presentation of acoustic emission measurements of the padded slider adjacent the non-textured landing zone with and without the stimulated take off process during spin up of the disc drive of FIG. 1.

In FIG. 9, acoustic emission plots 184 and 186 show results of an acoustic emission test conducted during the same test that yielded the results shown by FIG. 8. Without the stimulated take off process, the acoustic emission signal shown by the acoustic emission plot 184 never reaches 0, indicating constant contact of the head with the disc surface. When the stimulated take off process is used, separation of the read/write head 118 with padded sliders 172 (of FIG. 5) from the non-textured landing zone 174 (of FIG. 5) is confirmed (zero acoustic emission) after 3.3 seconds. Since the area under the curve of friction vs. time is proportional to interface wear, the advantage of the stimulated take off process is dramatically apparent from the data represented in both FIG. 3 and FIG. 4.

Figure 10:
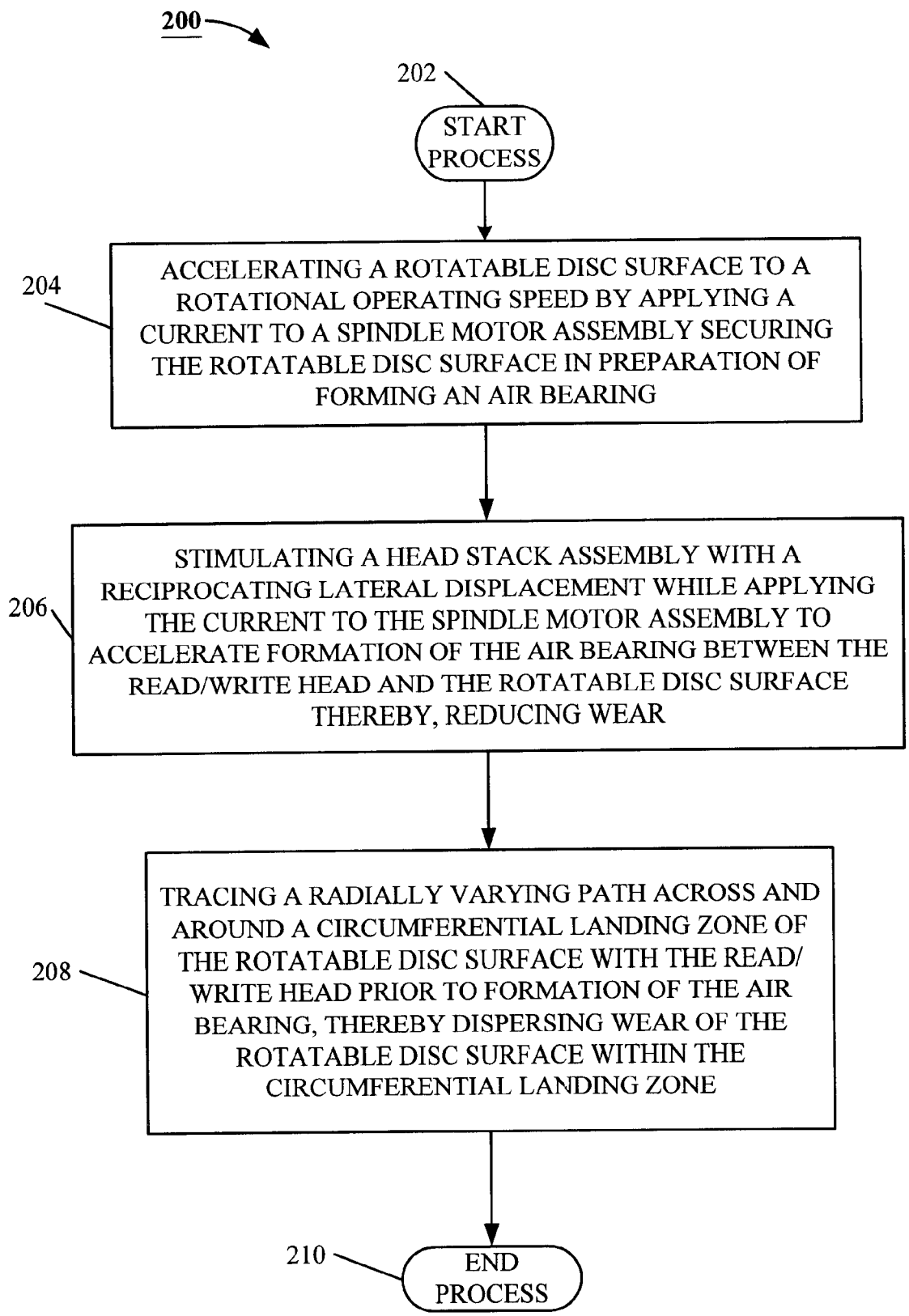
FIG. 10 is a flow diagram showing steps for applying a first embodiment for incorporating of a method for wear reduction of a rotatable disc surface through implementation of a stimulated take off process of the read/write head of the disc drive of FIG. 1.

FIG. 10 shows a flow diagram of an embodiment of a stimulation take off process 200 used for reduced wear of a carbon overcoat (such as 166) of a rotatable disc surface (such as 106) of a disc drive (such as 100). The stimulation take off process 200 starts at start process step 202 and continues with step 204. At process step 204, a current is applied to a spindle motor assembly (such as 104) securing the rotatable disc surface, to accelerate the rotatable disc surface in preparation of forming an air bearing between the read/write head (such as 118) with a padded slider (such as 172) and the carbon overcoat of the rotatable disc surface.

The stimulation take off process 200 continues with process step 206 where a head stack assembly (such as 110) is stimulated with a reciprocating lateral displacement while the current is applied to the spindle motor assembly to accelerate formation of the air bearing between the read/write head and the rotatable disc surface, thereby reducing wear of the rotatable disc surface.

Continuing with process step 208 of the stimulation take off process 200, the read/write head traces a radially varying path across and around a circumferential landing zone (such as 136) of the rotatable disc surface prior to formation of the air bearing, thereby disbursing wear encountered by the carbon overcoat of the rotatable disc surface within the circumferential landing zone. The stimulation take off process 200 concludes at end process step 210.

In accordance with one aspect of a preferred embodiment, a method for dispersing and reducing wear of a rotatable disc surface using a stimulated take off process to accelerate formation of an air bearing between a read/write head and a rotatable disc surface of a disc drive includes: accelerating the rotatable disc surface to a rotational operating speed by applying current to a spindle motor assembly securing the rotatable disc surface in preparation of forming the air bearing, such as step 204; stimulating a head stack assembly with a reciprocating lateral displacement while applying the current to the spindle motor assembly to accelerate formation of the air bearing between the read/write head and the rotatable disc surface, thereby reducing wear, such as step 206; and tracing a radially varying path across and around a circumferential landing zone of the rotatable disc surface with the read/write head prior to formation of the air bearing, thereby dispersing wear of the rotatable disc surface within the circumferential landing zone, such as step 208.

It is to be understood that even though numerous characteristics and advantages of various embodiments of the present invention have been set forth in the foregoing description, together with details of the structure and functions of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements of the stimulation signal may vary depending on the particular application of the stimulation signal while maintaining substantially the same functionality without departing from the scope and spirit of the present invention. In addition, although the preferred embodiment described herein is directed to a method for wear reduction of a rotatable disc surface of a disc drive system, it will be appreciated by those skilled in the art that the teachings of the present invention can be applied to other systems without departing from the scope and spirit of the present invention.

What is claimed is:

1. A method comprising:
   rotating a rotatable disc adjacent a read/write head of a head/disc interface; and
   hastening formation of a fluid bearing between said disc and said head by stimulating said head with a repetitive reciprocating lateral displacement follow commencement and continuance of a rotation of said disc irrespective of a rotational velocity of said disc.

2. The method of claim 1, in which said head is supported by a head stack assembly, and in which said hastening step comprises:
   generating a stimulation voltage signal at a frequency determined by said head/disc interface and comprising a predetermined amplitude, profile and duration; and
   applying said stimulation voltage signal to an actuator coil of said head stack assembly to provide said displacement of said head.

3. The method of claim 1, in which said head is supported by a head stack assembly, and in which said hastening step comprises:
   providing a stimulus voltage signal of predetermined amplitude, frequency, profile and duration;
   applying said stimulus voltage signal to an actuator coil of said head stack assembly and subsequently halting application of said stimulus voltage signal to said actuator coil prior to commencement of rotation of said disc, said stimulus voltage signal disrupts an adhesion/meniscus force developed between said head and said disc;
   generating a stimulation voltage signal at a frequency determined by said head/disc interface and comprising a predetermined amplitude, profile and duration; and
   conducting said stimulation voltage signal to said actuator coil which provides said displacement of said head that breaks said adhesion/meniscus force and hastens formation of said fluid bearing.

4. The method of claim 1, further comprising a step of tracing a radially varying path across and around a circumferential landing zone of said disc with said head prior to formation of said fluid bearing, in which said disc has an inner radius and an outer radius and in which the circumferential landing zone is a non-textured circumferential landing zone adjacent the inner radius of the rotatable disc surface.

5. The method of claim 1, further comprising a step of tracing a radially varying path across and around a circumferential landing zone of said disc with said head prior to formation of said fluid bearing, in which said disc has an inner radius and an outer radius and in which the circumferential landing zone is a non-textured circumferential landing zone adjacent the outer radius of the rotatable disc surface.

6. The method of claim 1 in which the read/write head is a read/write head having padded sliders.

7. The method of claim 1, in which the rotatable disc has an inner radius, wherein a circumferential landing zone is adjacent the inner radius, and in which the circumferential landing zone comprises induced eruptions providing a textured surface.

8. The method of claim 1, in which the rotatable disc surface has an outer radius, wherein a circumferential landing zone is adjacent the outer radius, and in which the circumferential landing zone comprises induced eruptions providing a textured surface.

9. An apparatus comprising:
   a spindle motor assembly supporting a rotatable disc adjacent a read/write head of a head/disc interface; and
   a positioning mechanism comprising an actuator coil position-controlling said head adjacent said disc, said actuator coil induces a repetitive reciprocating lateral displacement of said head relative to said disc following commencement and continuance of a rotation of said disc irrespective of a rotational velocity of said disc to hasten formation of a fluid bearing between said disc and said head.

10. The apparatus of claim 9, in which the read/write head is a read/write head having padded sliders.

11. The disc drive of claim 9, in which the repetitive reciprocating displacement induced on the read/write head traces a radially variable path on a circumferential non-textured landing zone of the rotatable disc while the spindle motor assembly rotates the rotatable disc beneath the read/write head.

12. The disc drive of claim 9, in which the rotatable disc has an inner radius, wherein a circumferential landing zone of the rotatable disc is adjacent the inner radius, and in which the circumferential landing zone comprises induced eruptions providing a textured surface.

13. A disc drive having a basedeck supporting a control electronics and further supporting a spindle motor assembly with an attached rotatable disc surface having a non-textured landing zone, comprising:

a positioning mechanism with an actuator coil position-controlling a read/write head selectively adjacent the rotatable disc surface; and a stimulation signal provided by the control electronics stimulating the actuator coil to impart a small reciprocal displacement to the read/write head by steps for dispersing and reducing wear of the rotatable disc surface.

14. The disc drive of claim 13, in which steps for dispersing and reducing wear of said disc surface comprise:

rotationally accelerating said disc surface; and hastening formation of a fluid bearing between said disc surface and said head by inducing said displacement of said head by applying said stimulation signal to said head following commencement and continuance of a rotation of said disc irrespective of a rotational velocity of said disc.

15. The disc drive of claim 14, in which the hastening step comprises:

generating said stimulation signal at a frequency determined by said head/disc interface and comprising a predetermined voltage, amplitude, profile and duration; and breaking an adhesion/meniscus force developed between said head and said disc with said displacement of said head by applying said stimulation signal to said actuator coil.

16. The disc drive of claim 14, in which hastening step comprises:

providing a stimulus signal of a predetermined voltage, amplitude, frequency, profile and duration;

disrupting an adhesion/meniscus force developed between said head and said disc by applying said stimulus signal to said actuator coil and subsequently halting application of said stimulus voltage signal to said actuator coil prior to commencement of rotation of said disc, said stimulus signal inducing a first repetitive reciprocal displacement of the read/write head;

generating said stimulation signal at a frequency determined by said head/disc interface and comprising a predetermined voltage, amplitude, profile and duration; and breaking the adhesion/meniscus force developed between said head and said disc by applying said stimulation signal to said actuator coil, said stimulation signal inducing said small repetitive reciprocal displacement of said head.

17. The disc drive of claim 16, in which the frequency of said stimulus signal frequency is 50–150 Hz.

18. The disc drive of claim 16, in which the frequency of said stimulation signal frequency is 5–50 Hz.

19. The disc drive of claim 14, further comprising a step of tracing a radially varying path on a landing zone of the rotatable disc with the read/write head prior to formation of the fluid bearing, in which the rotatable disc has an inner radius and an outer radius, and in which the landing zone is a non-textured circumferential landing zone adjacent the inner radius of the rotatable disc surface.

20. The disc drive of claim 14, further comprising a step of tracing a radially varying path on a landing zone of the rotatable disc with the read/write head prior to formation of the fluid bearing, in which the rotatable disc has an inner radius and an outer radius, and in which the landing zone is a non-textured circumferential landing zone adjacent the outer radius of the rotatable disc surface.

* * * * *